Figure 1:
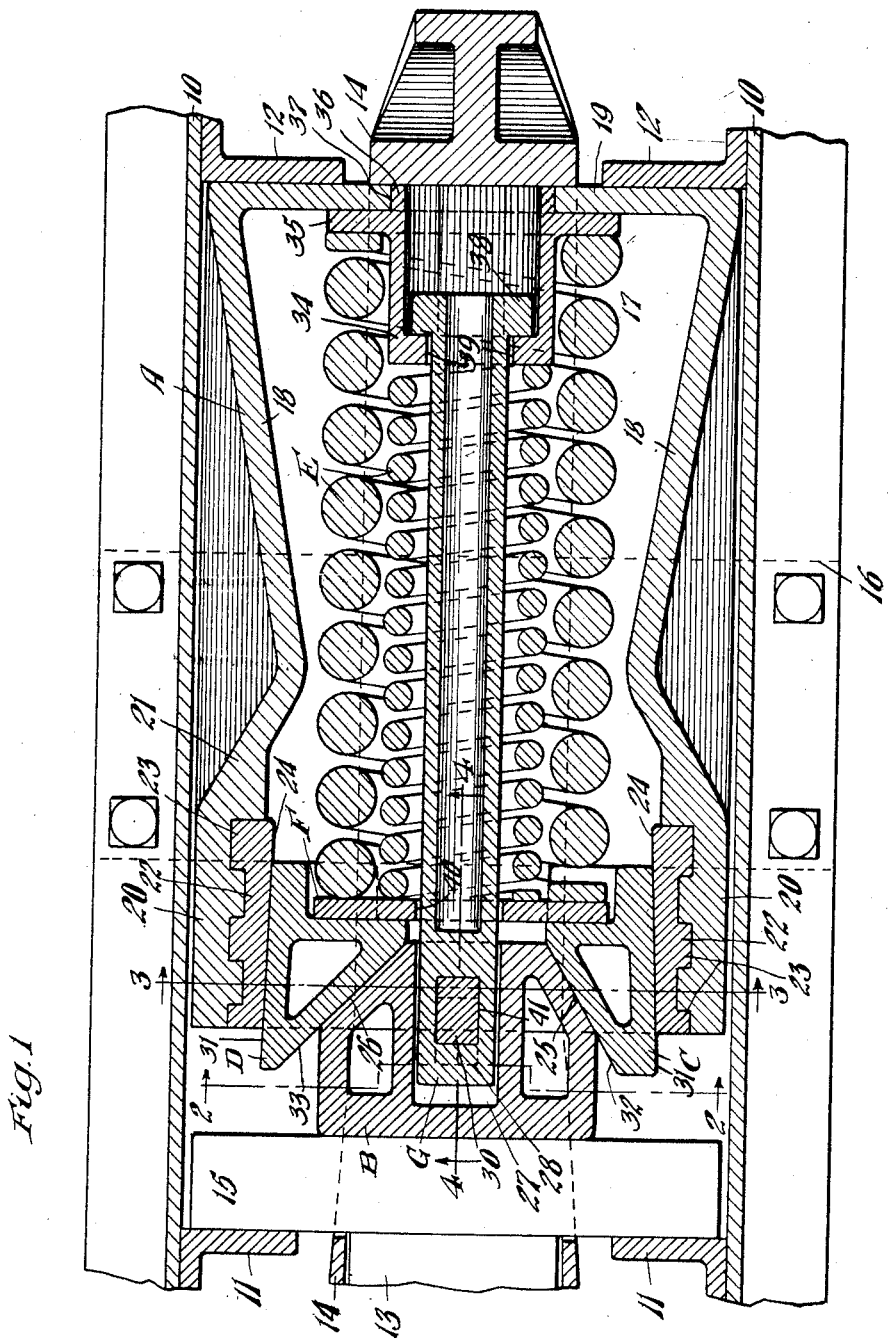

Oct. 8, 1929.  J. F. O'CONNOR  1,730,864

FRICTION SHOCK ABSORBING MECHANISM

Filed April 14, 1927   2 Sheets-Sheet 1

Witness
Wm. Geiger

Inventor
John F. O'Connor
By George I. Haight
His Atty.

Oct. 8, 1929.  J. F. O'CONNOR  1,730,864
FRICTION SHOCK ABSORBING MECHANISM
Filed April 14, 1927  2 Sheets-Sheet 2
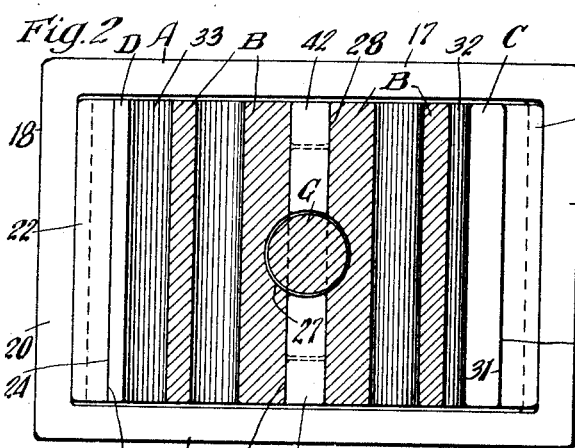
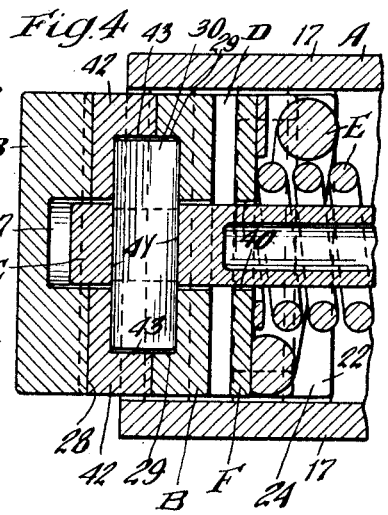
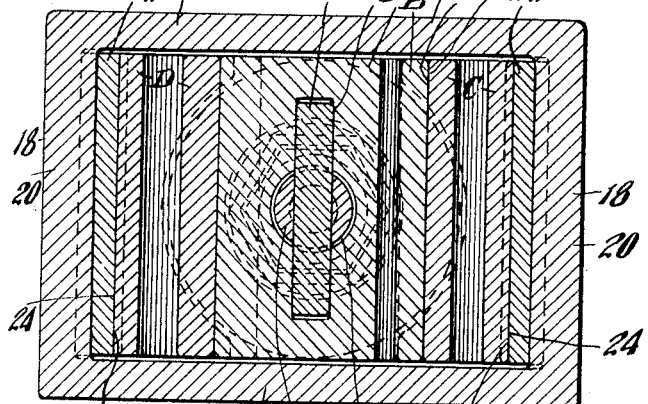
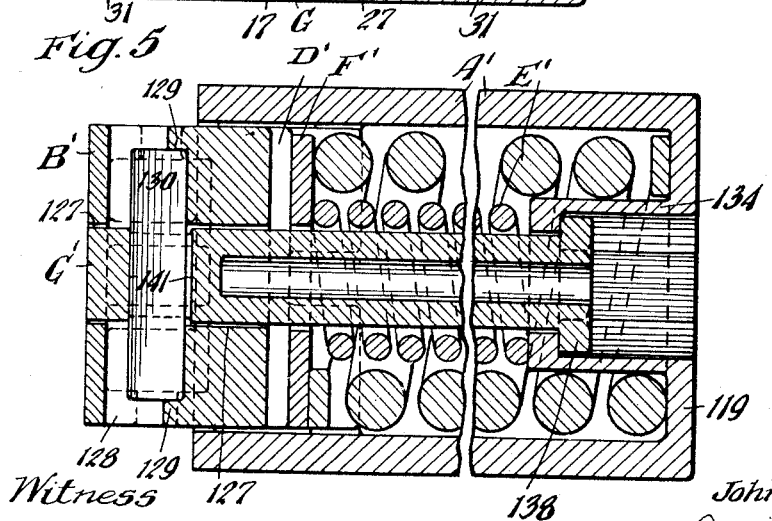
Inventor
John F. O'Connor
By George I. Haight
His Atty.
Witness
Wm. Geiger Patented Oct. 8, 1929

1,730,864

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Application filed April 14, 1927. Serial No. 183,681.

This invention relates to improvements in friction shock absorbing mechanisms.

One object of the invention is to provide a friction shock absorbing mechanism especially adapted for railway draft riggings, of the type having a friction shell and spring resistance means co-operating therewith, including a combined pressure transmitting and spreading element, wherein means of rugged design is provided for holding the wedge assembled with the mechanism and maintaining uniform overall length of the parts, including efficient and reliable means for anchoring the retaining means to the spreading element.

A more specific object of the invention is to provide in a friction shock absorbing mechanism of the character indicated, including a combined pressure transmitting spreading element in the form of a wedge, means for limiting outward movement of the wedge and holding the parts assembled, including a retaining bar anchored to the wedge, wherein a key of heavy design is employed to secure the wedge to the bar, together with means for preventing accidental displacement of the key member.

Other objects and advantages of the invention will more fully and clearly appear from the description and claims hereinafter following.

In the drawings, forming a part of this specification, Figure 1 is a horizontal longitudinal sectional view of a railway draft rigging, showing one embodiment of my invention in connection therewith. Figure 2 is a transverse vertical sectional view corresponding substantially to the line 2—2 of Figure 1. Figure 3 is a transverse vertical sectional view corresponding substantially to the line 3—3 of Figure 1. Figure 4 is a longitudinal vertical sectional view of the front end of the shock absorbing mechanism proper illustrated in Figure 1 and corresponding substantially to the line 4—4 of Figure 1. Figure 5 is a longitudinal vertical sectional view partly broken away of a shock absorbing mechanism, illustrating a different embodiment of my invention.

Referring first to the embodiment of the invention illustrated in Figures 1 to 4, inclusive, 10—10 indicate channel shaped center or draft sills of a railway car underframe, to the inner sides of which are secured front stop lugs 11—11 and rear stop lugs 12—12. The inner end of the drawbar is designated by 13, to which is operatively connected a yoke 14 of well known form. The shock absorbing mechanism proper and a front main follower 15 are disposed within the yoke, and the yoke in turn is supported by a detachable saddle plate 16 secured to the draft sills.

The embodiment of the invention as illustrated in Figures 1 to 4, inclusive, comprises broadly, a spring cage A; a wedge B; two friction shoes C and D; a spring resistance E; a spring follower F; and a retaining element G.

The spring cage A is in the form of a hollow box-like casting having horizontally disposed longitudinally extending spaced top and bottom walls 17—17; longitudinally disposed side walls 18—18 and a transverse end wall 19. The end wall 19 co-operates with the stop lugs 12 in the manner of the usual rear follower. At the front end, the spring cage is provided with a friction shell section 20 of substantially rectangular outline. Rearwardly of the friction shell section 20, the side walls 18 of the cage A are offset inwardly as indicated at 21, the rear sections of the side walls diverging toward the rear end of the mechanism, as clearly shown in Figure 1. The friction shell section 20 is provided with liners 22—22 disposed at opposite sides of the mechanism, the liners and side walls of the friction shell section being provided with interlocking lugs 23 to anchor the liners to the shell against longitudinal movement. On the inner sides, the liners 22 are provided with longitudinally disposed inwardly converging friction surfaces 24—24.

The wedge block B is in the form of a cored casting having a flat front end face bearing directly on the main follower 15. At the inner end, the block B is provided with a pair of rearwardly converging wedge faces 25 and 26 on opposite sides thereof. The wedge face 25 is disposed at a relatively keen wedge acting angle with respect to the longitudinal axis of the mechanism, while the wedge face 26 is disposed at a relatively blunt releasing angle with respect to said axis. The wedge block B is also provided with a central opening 27 adapted to receive the front end portion of the retaining element G. The wedge block B is vertically slotted as indicated at 28, the slot 28 being in vertical alignment with the opening 27. The slot 28 is rearwardly offset between its ends as indicated at 29 to provide a seat for the key member 30 which co-operates with the retaining element G.

The friction shoes C and D are disposed at opposite sides of the mechanism and are interposed between the wedge block B and the liners 22. The friction shoes are of similar design except as hereinafter pointed out. Each shoe is provided with a longitudinally disposed outer friction surface 31 adapted to co-operate with the friction surface 24 of the corresponding liner 22. On the inner side, each shoe is provided with a lateral enlargement having a wedge face at the front side thereof, the wedge face of the shoe C being designated by 32 and co-operating with the wedge face 25 of the block B, and the wedge face of the shoe D being designated by 33 and co-operating with the wedge face 26 of said block.

The spring resistance E comprises an inner relatively light coil and a heavier outer coil having their front ends bearing on the spring follower F which directly engages the inner ends of the enlargements on the friction shoes C and D. The rear ends of the springs bear on a cup-shaped member 34 having an annular flange 35 on which the outer coil of the spring bears, the enlarged flange directly engaging the end wall 19 of the spring cage. The cup-shaped member 34 is of hexagonal cross-section as most clearly shown in Figure 3, for a purpose hereinafter pointed out. At the rear end, the cup member 34 is provided with a flange 36 seated in an opening 37 in the end wall 19 of the cage A. The opening 37 and the flange 36 are preferably of hexagonal outline so as to determine the position of the cup-shaped member. As clearly shown in Figure 1, the rear end of the inner coil of the spring resistance E bears on the forward end of the cup 34.

The retainer element G is in the form of an elongated cylindrical bar having a hexagonal head 38 at the rear end thereof, the head 38 being accommodated within the hexagonal section of the cup member 34, thereby determining the position of the bar with respect to the cup-shaped member. As clearly shown in Figures 1, 2 and 4, the shank of the retaining element G extends through aligned openings 39 and 40 in the cup-shaped member 34 and spring follower F respectively, and the front end of the retaining element is accommodated within the opening 27 of the wedge block B. Adjacent the forward end, the retaining element G is vertically slotted as indicated at 41 to receive the key member 30. When the parts are assembled, the key member 30 is seated within the pocket or seat 29 of the slot of the wedge block B and extends through the opening 41 of the retaining element G, thereby anchoring the wedge block to the retaining element. In order to permit assembling of the key, and insertion of the same within the slot 41 of the retaining element G, the opening 27 of the wedge block B is elongated, as most clearly shown in Figure 4, to permit alignment of the slot 41 with the main portion of the vertical slot 28 of the block B. In order to prevent accidental displacement of the key member after the parts have been assembled, a pair of locking plugs 42—42 are inserted in the top and bottom ends of the slot 28 on the wedge block B. As clearly shown in Figure 4, the locking plugs 42 are cut away as indicated at 43 on their inner sides to fit over the corresponding ends of the key 30.

In assembling the mechanism, the liners, friction shoes, spring follower, main spring resistance elements, together with the cup member 34, are inserted within the spring cage. The retaining element G is then entered through the rear end of the cage, by passing the same through the opening 39 of the cup member 34. Pressure is then applied to the retaining element through the medium of a bar or any other means to force the same forwardly until the slot 41 at the forward end thereof is disposed outwardly beyond the front end of the spring cage. The wedge block is then placed in position on the front end of the retaining element G and held against outward movement. The retaining element G is then forced forwardly while the wedge block is so held until the slot 41 of the retaining element is brought into alignment with the main portion of the vertical slot 28 of the wedge block B. The key 30 is then inserted through the slot 28 of the wedge block into the slot 41 of the retaining element until the same registers with the pocket 29. Pressure on the retaining element G is then released, permitting the spring resistance E to pull the retaining element rearwardly, thereby seating the key 30 in the pocket 29 of the wedge block. It will be evident that the key will thus be held against endwise displacement by the shoulders at the top and bottom of the pocket 29. In order to prevent accidental displacement of the key 30, the retaining plugs 42 may be inserted within the top and bottom ends of the slot 28. When these plugs are employed, they are inserted while the wedge block B is disposed in such a position that the slot 28 is located outwardly beyond the front end of the spring cage A.

The operation of my improved shock absorbing mechanism as illutrated in Figures 1 to 4, inclusive, assuming a compression stroke, is as follows: The main follower 15 and the spring cage A will be moved relatively toward each other, thereby forcing the wedge block B inwardly of the cage and setting up a wedging action between the same and the shoes C and D. At the same time, the shoes will be carried inwardly on the friction surfaces of the liners 22 resisted by the spring E. This action will continue either until the actuating force is reduced or the main follower engages the outer end of the spring cage A, whereupon the actuating force will be transmitted directly through the spring cage A, the latter acting as a solid column load transmitting member. In release, when the actuating force is reduced, the main spring resistance E will force the friction shoes and wedge member B outwardly until movement of the wedge B is limited by the retaining element G, outward movement of the retaining element being limited by the front end wall of the cup-shaped member 34 which is held in its innermost position in contact with the end wall 19 of the spring cage by the spring resistance E.

Referring next to the embodiment of the invention illustrated in Figure 5, the same comprises a spring cage A' having a friction shell section at the forward end thereof; a wedge block B'; a pair of friction shoes similar to the friction shoes C and D described in connection with the invention illustrated in Figures 1 to 4, inclusive; a spring resistance E'; a spring follower F'; and a retaining element G'.

The friction shell A' is provided with liners similar to those hereinbefore described in connection with Figures 1 to 4, inclusive, the liners having inwardly converging friction surfaces with which two friction shoes similar to the shoes C and D hereinbefore described co-operate. The wedge block B' which co-operates with the friction shoes is provided with a longitudinal central opening 127 extending entirely therethrough. The block B' is also provided with a vertical key receiving slot 128 extending entirely therethrough and having an offset central section 129 providing a pocket or seat for the retaining key 130. The retaining element G' is in the form of an elongated cylindrical bar having a head 138 of hexagonal outline at the rear end thereof. The head 138 is disposed within a hollow boss 134 formed integral with the end wall 119 of the spring cage A and forwardly projecting therefrom. The boss 134 is of hexagonal cross-section so as to fit the hexagonal head 138 of the retaining element G'. The retaining element G' is held against forward movement by engagement of the head thereof with the end wall of the boss 134. At the forward end, the retaining element G' is provided with a vertical slot 141 adapted to receive the key 130. As clearly shown in Figure 5, the front end of the retaining element G' is adapted to align with the front end of the wedge block B' when the parts are assembled so that the retaining element G' will be positively held against outward movement with respect to the wedge by engagement with the main follower 115 of the shock absorbing mechanism. The wedge block B' is anchored to the retaining element G' by the key 130 which, when the parts are assembled, is seated within the pocket 129 and extends through the slot 141 of the retaining element, the end walls of the pocket 129 holding the key against accidental displacement.

The spring resistance E' comprises an inner relatively light coil and an outer relatively heavier coil, both of the coils having their outer ends bearing on the spring follower F' which engages the friction shoes. The rear end of the outer coil bears directly on the end wall 119 of the cage A and the rear end of the inner coil bears on the front end of the boss 134.

In assembling the parts of the mechanism, the liners, friction shoes, spring follower and main spring resistance are all inserted within the spring cage. The retaining element G' is then inserted through the rear end of the spring cage and entered within the opening 127 of the wedge block B'. The wedge block is then forced inwardly of the mechanism, while the retaining element G' is held against inward movement, until the vertical slot 128 of the wedge block B' is brought into alignment with the vertical slot 141 of the retaining element. The key 130 is then inserted through the slot 128 of the wedge block into the slot 141 of the retaining element. When the key has been brought into alignment with the pocket 129, the parts are permitted to spread and the key is then seated within the pocket, thereby preventing endwise displacement of the key. When the key is in seated position as described, the front end of the retaining element G' is in alignment with the outer end of the wedge block so that the main follower will bear on both the wedge block and the other end of the retaining element, thereby holding the key seated within the pocket 129 of the wedge block B'. It will be evident that during assembly of the mechanism, the vertical slot 141 of the retaining element G' is accurately aligned with the vertical slot 128 of the wedge block B' by the hexagonal head 138 of the retaining element engaging within the hexagonal section of the boss 134.

The operation of the embodiment of the invention as illustrated in Figure 5 is substantially the same as that described in connection with the device illustrated in Figures 1 to 4, inclusive.

In both forms of the invention herein illustrated, the spring resistance elements are placed under initial compression when the mechanism is assembled so that the shoes are yieldingly maintained in their outermost position. By placing the springs under initial compression, compensation for wear of the various friction and wedge faces is also provided for.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a friction shell; of friction means including a pressure transmitting spreading element co-operating with the shell; spring means resisting movement of said friction means inwardly of the shell; a headed retaining element for the wedge insertable through the rear end of the shell; a cap to which said head is connected, said cap bearing on the inner end of said spring means; a key for anchoring the wedge to the retaining element; and means for holding said key against endwise displacement to prevent accidental removal of the same.

2. In a friction shock absorbing mechanism, the combination with a friction shell; of friction means co-operating with the shell, said friction means including a wedge block, said block having a shouldered opening; spring means opposing movement of said friction means inwardly of the shell; a retaining member for the wedge, said retaining member being connected at one end to the shell and having a transverse opening at the other end for anchoring the retaining member to the wedge, said key being insertable through the opening in the wedge and extending through said transverse opening of the retaining element, said key having the opposite ends thereof engaged by the shoulders on the wedge to hold the key against endwise displacement, to prevent accidental separation of said key and anchoring member.

3. In a friction shock absorbing mechanism, the combination with a friction shell; of friction shoes co-operating with the shell; spring means opposing movement of said shoes inwardly of the shell; a wedge member engaging said shoes; a retaining bar for said wedge; and a detachable key extending through the retaining bar for anchoring the wedge to the retaining bar, said wedge having spaced shoulders engaging the opposite ends of the key to prevent displacement thereof when the parts are assembled.

4. In a friction shock absorbing mechanism, the combination with a friction shell; of friction shoes cooperating with the shell; spring means opposing movement of the shoes inwardly of the shell; a wedge block provided with a transverse slot having stop shoulders thereon; retaining means for the wedge block, including a bar extending into the wedge provided with a key receiving opening; and a key for anchoring the wedge to the bar, said key being disposed within the slot of the wedge and extending through the opening of said bar and having the opposite ends thereof engaged by said shoulders to prevent accidental removal of the same.

5. In a friction shock absorbing mechanism, the combination with a friction shell; of friction shoes cooperating with the shell; spring means opposing movement of the shoes inwardly of the shell; a wedge block engaging the shoes, said wedge block being provided with a transverse slot, said slot having an offset providing a key retaining pocket; retaining means for the wedge, including a bar connected to the spring cage and extending into the wedge and having a transverse key receiving opening; and a key element for anchoring the wedge to the retaining means, said key fitting within said pocket and extending through the opening of the bar, said key being insertable through the transverse slot of the wedge.

6. In a friction shock absorbing mechanism, the combination with a main follower; of a spring cage having a friction shell section at one end thereof; friction shoes co-operating with said friction shell section; a wedge block engaging the shoes; retaining means for the wedge block, including a bar connected to the cage and extending through the wedge and engaging the main follower; a key for anchoring the bar to the wedge, said wedge being provided with a key receiving opening having an offset pocket portion for the key and in which the key is held by engagement of the main follower with the retaining bar; and spring resistance means opposing movement of said shoes inwardly of the shell and yieldingly forcing said shoes outwardly.

In witness that I claim the foregoing I have hereunto subscribed my name this 9th day of April, 1927.

JOHN F. O'CONNOR.